(12) United States Patent
Wang et al.

(10) Patent No.: US 12,385,511 B2
(45) Date of Patent: Aug. 12, 2025

(54) FASTENING APPARATUS

(71) Applicant: FIVETECH TECHNOLOGY INC., New Taipei (TW)

(72) Inventors: Ting-Jui Wang, New Taipei (TW); Hsien-Chang Chen, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 0 days.

(21) Appl. No.: 18/536,266

(22) Filed: Dec. 12, 2023

(65) Prior Publication Data

US 2024/0229841 A1    Jul. 11, 2024

(30) Foreign Application Priority Data

Jan. 5, 2023    (TW) ................................. 112100347

(51) Int. Cl.
*F16B 5/06*    (2006.01)
(52) U.S. Cl.
CPC .................................... *F16B 5/065* (2013.01)
(58) Field of Classification Search
CPC ....................................................... F16B 5/065
See application file for complete search history.

(56) References Cited

U.S. PATENT DOCUMENTS

| | | | | |
|---|---|---|---|---|
| 4,920,618 A | * | 5/1990 | Iguchi | F16B 13/061 24/297 |
| 2022/0071357 A1 | * | 3/2022 | Wang | A44B 19/36 |
| 2022/0196058 A1 | * | 6/2022 | Chang | F16B 5/0607 |

FOREIGN PATENT DOCUMENTS

| TW | I693350 B | 5/2020 |
|---|---|---|
| TW | I736410 B | 8/2021 |

* cited by examiner

*Primary Examiner* — David M Upchurch

(57) ABSTRACT

A fastening apparatus includes a base, a clasp body, and an elastic body. The base is configured to be arranged at a first object. The clasp body is movably disposed at the base, and movably couples or separates the second object. The elastic body is disposed between the base and the clasp body and pushes against the clasp body, such that the clasp body is normally located at an engaging connection position or normally located at a disengagement position. Thus, the base can be assembled with the first object and can be engaging connected with or disengaged from the second object using the clasp body, so as to complete quick coupling and separation of two objects, further achieving effects of repeated quick coupling and separation.

11 Claims, 5 Drawing Sheets

FASTENING APPARATUS

CROSS-REFERENCE TO RELATED APPLICATION

This non-provisional application claims priority under 35 U.S.C. § 119(a) on Patent Application No(s). 112100347 filed in Taiwan, R.O.C. on Jan. 5, 2023, the entire contents of which are hereby incorporated by reference.

BACKGROUND OF THE INVENTION

1. Field of the Invention

The present disclosure provides a fastening apparatus, and in particular to a fastening apparatus for repeatedly and quickly coupling and separating at least two objects.

2. Description of the Related Art

In general, when at least one object is to be coupled, lock connection is usually performed using a screw for coupling the object.

In the conventional fixing means above, although at least one object can be fixed and coupled in a form that is not easily separated, in addition to unhandy assembly, the least one object may not be easily removed due to the fixed coupling means using the screw.

BRIEF SUMMARY OF THE INVENTION

In view of the prior art above, the present disclosure provides a fastening apparatus in aim of achieving effects of repeated quick coupling and easy separation.

To achieve the above and other objects, the present disclosure provides a fastening apparatus including a base, a clasp body, and an elastic body. The base is configured to be arranged at a first object. The clasp body is movably disposed at the base, and movably couples to or separates from a second object. The elastic body is disposed between the base and the clasp body and pushes against the clasp body, such that the clasp body is normally located at an engaging connection position or normally located at a disengagement position.

In the fastening apparatus, a bottom of the base is provided with at least one assembly section, which is for the base to be arranged at the first object.

In the fastening apparatus, the assembly section is arranged at the first object by means of an engaging connection, welding connection, lock connection, expansion connection, or adhesion.

In the fastening apparatus, the bottom of the base is provided with at least one anti-rotation assembly section, which is for the base to be arranged at the first object and provides an anti-rotation function.

In the fastening apparatus, the base is provided with at least one locking section, which can coordinate with a locking fixture for the base to be arranged at the first object.

In the fastening apparatus, the base is provided with a containment area, in which the clasp body and the elastic body are movably disposed.

In the fastening apparatus, each of two sides of the clasp body is provided with a sliding portion, and each of two sides in the base is provided with a sliding groove, wherein each of the sliding portions is docked with each of the sliding grooves so as to movably dispose the clasp body at the base.

In the fastening apparatus, each of the sliding portions is provided with a limiting slider, and each of the sliding grooves is provided with a sliding restriction section, wherein each of the limiting slider is disposed at each of the sliding restriction section, so as to limit a movement distance of the clasp body on the base.

In the fastening apparatus, each of two sides of the base is provided with a guiding section, and each of the limiting sliders is disposed at each of the sliding restriction sections via each of the guiding sections.

In the fastening apparatus, one end of the clasp body is provided with a first limiting flange or a second limiting flange. The first limiting flange or the second limiting flange can be used to engaging connect and couple the second object, or disengage and separate the second object.

In the fastening apparatus, one end of the first limiting flange is provided with a guiding slope section, and the second object pushes against the guiding slope section, such that the clasp body is pushed and reset by the elastic body after moving horizontally, and the first limiting flange or the second limiting flange engaging connects and couples with the second object.

In the fastening apparatus, the second object is provided with a recessed section, and the recessed section of the second object is fitted into the second limiting flange via the first limiting flange, such that the first limiting flange abuts against the second object.

In the fastening apparatus, one end of the base is provided with a contact section which corresponds to the first limiting flange, such that the first limiting flange abuts against a top surface of the second object and the contact section abuts against a bottom surface of the second object.

In the fastening apparatus, the clasp body is provided with an operating section, which is operable to control the clasp body to move horizontally on the base, such that the clasp body coordinates with the base for engaging connection or disengagement, further coupling or separating the second object.

In the fastening apparatus, one end of the elastic body is integrally connected with the clasp body, and the other end of the elastic body pushes against the base, such that the elastic body pushes the clasp body to be normally located at a lock position or normally located at an unlock position.

In the fastening apparatus, one end of the elastic body is provided with a compression segment, and the other end of the elastic body is provided with an assembly section. The compression segment and the clasp body are integrally connected, and the assembly section is joined at a securement section of the base, such that the elastic body pushes the clasp body to be normally located at a lock position or normally located at an unlock position.

In the fastening apparatus, the elastic body is an elastic element bending continuously.

In the fastening apparatus, the elastic element is a plastic member, a metal member, or an elastic piece integrally connected with the clasp body.

In the fastening apparatus above, an appearance of the elastic element or an appearance of an elastic region generated by the elastic element is in an S shape, a continuous S shape, an approximate S shape, or an approximate continuous S shape.

Thus, in the fastening apparatus of the present disclosure, the base can be assembled with the first object and can be engaging connected with or disengaged from the second object using the clasp body, so as to complete quick coupling and separation of two objects, further achieving objects of repeated quick coupling and separation.

DETAILED DESCRIPTION OF THE INVENTION

Figure 1:
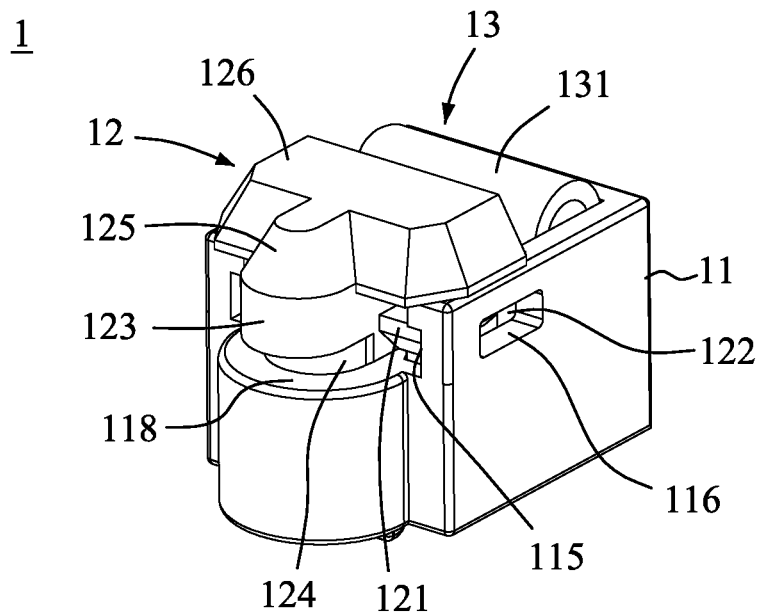
FIG. 1 is a schematic diagram of an appearance of a fastening apparatus of an embodiment of the present disclosure.
Figure 2:
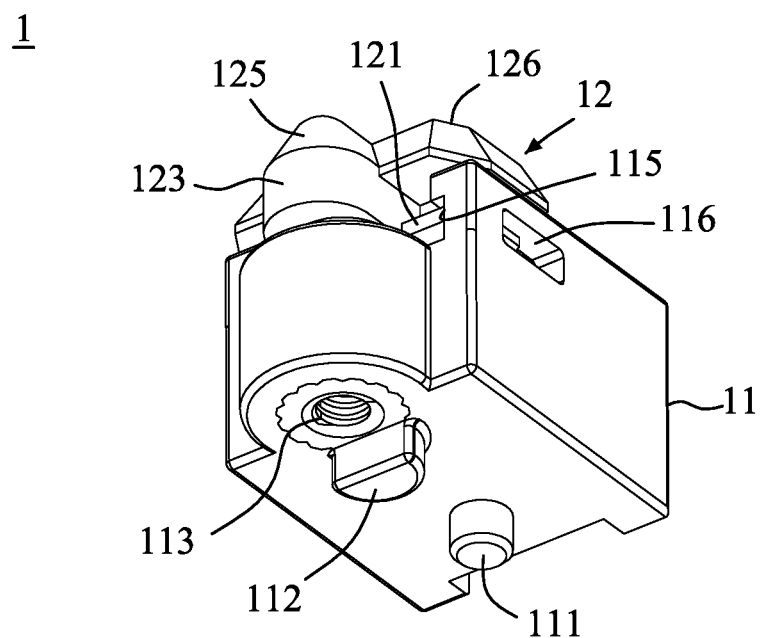
FIG. 2 is a schematic diagram of an appearance of a fastening apparatus of an embodiment of the present disclosure.
Figure 3:
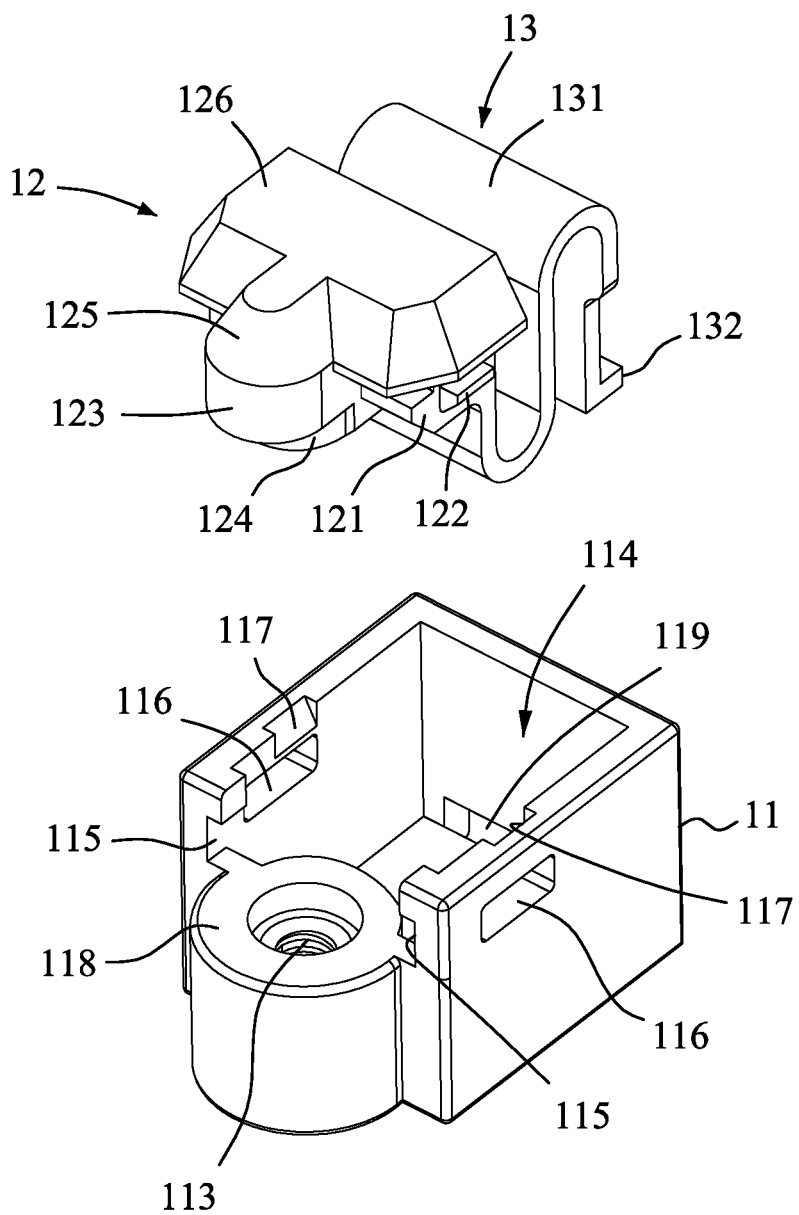
FIG. 3 is an exploded schematic diagram of a fastening apparatus of an embodiment of the present disclosure.
Figure 4:
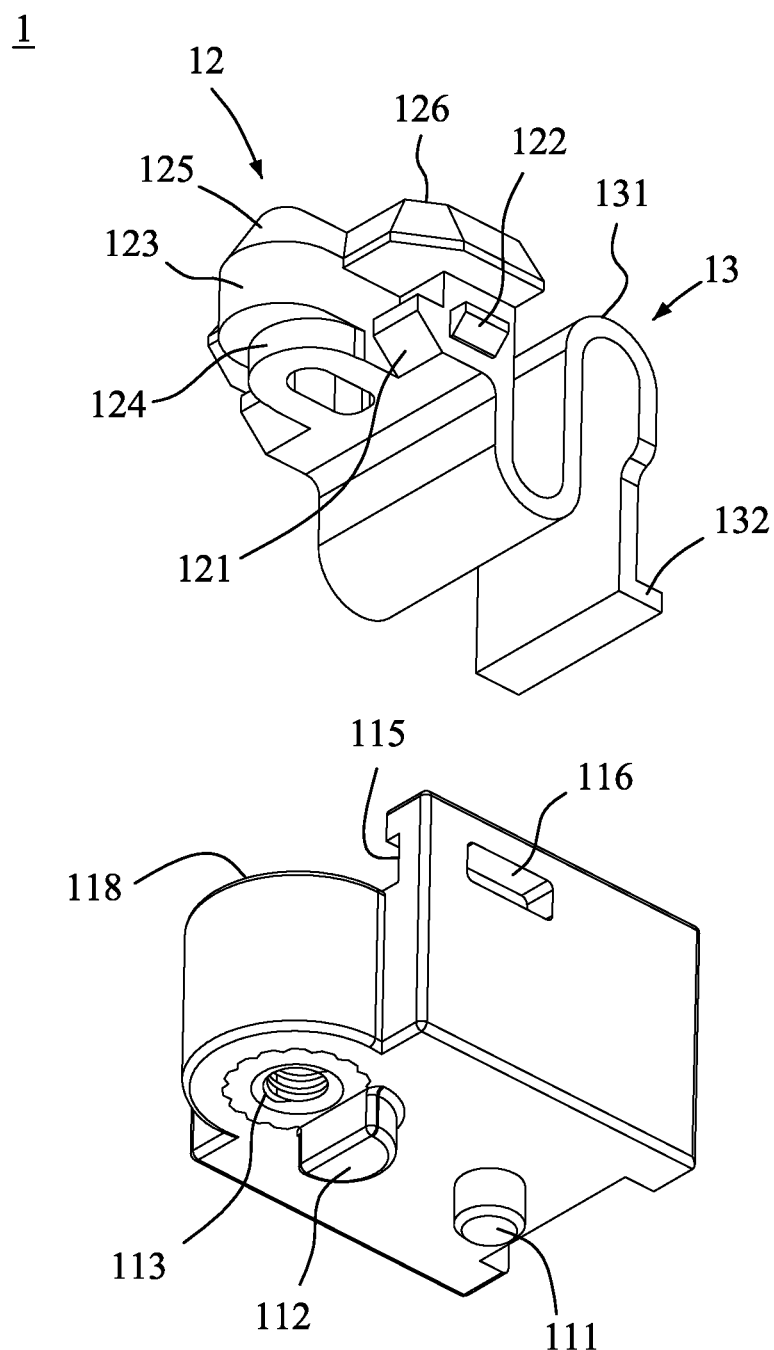
FIG. 4 is an exploded schematic diagram of a fastening apparatus of an embodiment of the present disclosure.
Figure 5:
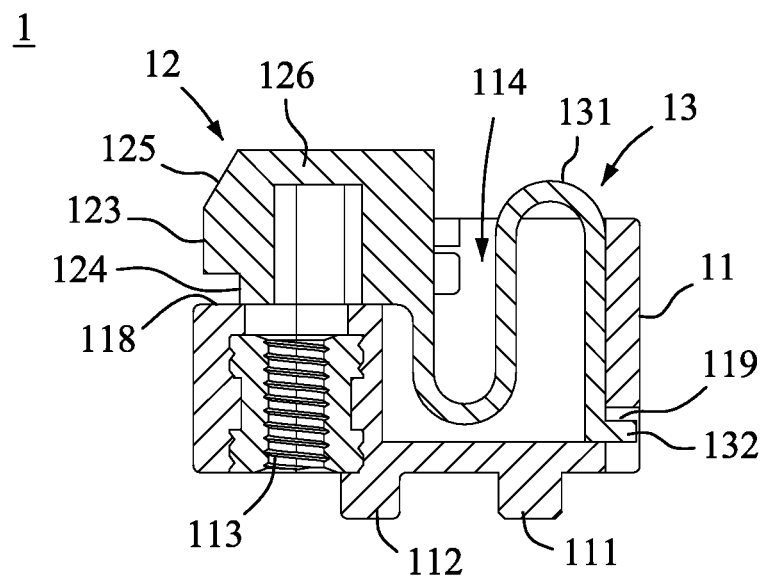
FIG. 5 is a schematic diagram of a cross-section state of a fastening apparatus of an embodiment of the present disclosure.

To facilitate understanding of the object, characteristics, and effects of the present disclosure, embodiments together with the attached drawings for the detailed description of the present disclosure are provided.

Refer to FIG. 1 to FIG. 7. As shown in the drawings, the present disclosure provides a fastening apparatus 1 including a base 11, a clasp body 12, and an elastic body 13.

The base 11 can be arranged at a first object 10.

The clasp body 12 is movably disposed at the base 11, and horizontally moves and coordinates with the base 11 for engaging connection or disengagement, such that the clasp body 12 couples or separates a second object 20.

The elastic body 13 is disposed between the base 11 and the clasp body 12 and pushes against the clasp body 12, such that the clasp body 12 is normally located at an engaging connection position or normally located at a disengagement position.

Figure 6:
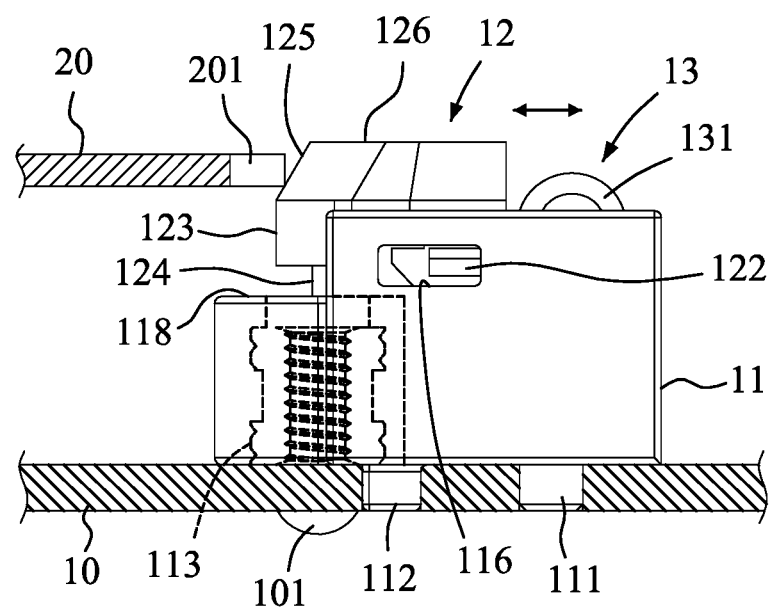
FIG. 6 is a schematic diagram of a state of use of a fastening apparatus of an embodiment of the present disclosure.
Figure 7:
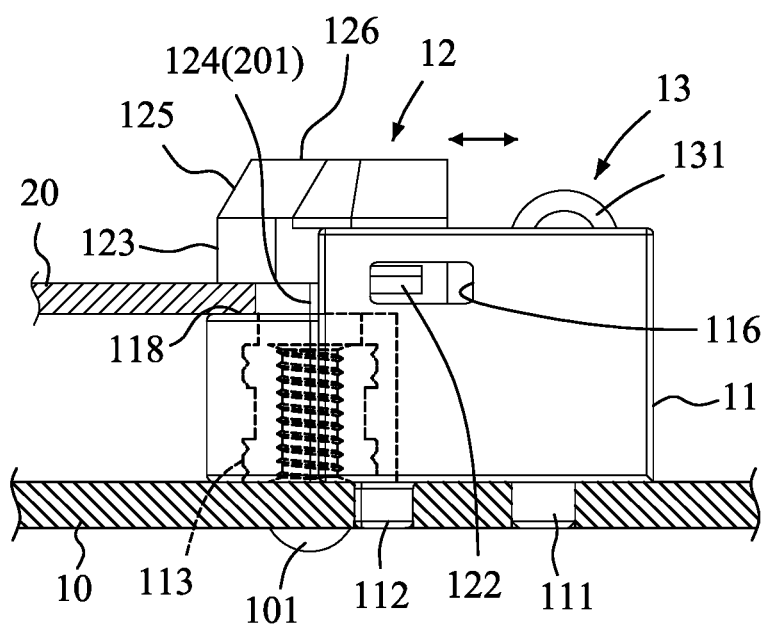
FIG. 7 is a schematic diagram of a state of use of a fastening apparatus of an embodiment of the present disclosure.

During use, the fastening apparatus 1 can be assembled on the first object 10, and then the second object 20 is directly pressed down upon one end of the clasp body 12 (or by manually applying a force upon the clasp body 12), such that the clasp body 12 moves horizontally and compresses the elastic body 13. Once the second object 20 abuts against a top of one end of the base 11, the elastic body 13 is reset and the clasp body 12 is pushed, and a bottom of one end of the clasp body 12 coordinates with the top of one end of the base 11 so as to be engaging connected to the second object 20, such that the clasp body 12 is locked at the second object 20, hence completing coupling between the clasp body 12 and the second object 20 (as shown in FIG. 6 and FIG. 7).

To separate the second object 20, the clasp body 12 is moved horizontally in a direction away from the second object 20 and the elastic body 13 is compressed, such that the clasp body 12 separates from the second object 20. Then, the elastic body 13 is reset and the clasp body 12 is pushed to be ready to perform a next operation of the clasp body 12. Thus, the base 11 can be assembled with the first object 11, and the base 11 can be engaging connected and disengaged with the coordination of the clasp body 12, so as to couple or separate the clasp body 12 from the second object 20 to complete coupling and separation of two objects, hence achieving the effects of repeated quick coupling and separation.

In addition to the embodiments above, in an embodiment of the present disclosure, the base 11 is provided with at least one assembly section 111. The assembly section 111 is disposed at a bottom of the base 11, and is for the base 11 to be arranged at the first object 10 by means of a soldering connection, welding connection, engaging connection, lock connection, expansion connection, or adhesion. Thus, the base 11 can be stably arranged at the first object 10 to facilitate a movement operation of the clasp body 12.

In addition to the embodiments above, in an embodiment of the present disclosure, the base 11 is provided with at least one anti-rotation assembly section 112. The anti-rotation assembly section 112 is disposed at the bottom of the base 12 and near the assembly section 111. The assembly section 111 and the anti-rotation assembly section 112 are for the base 11 to be arranged at the first object 10, and the anti-rotation assembly section 112 provides an anti-rotate function once the base 11 is arranged at the first object 10. Thus, the base 11 can be stably arranged at the first object 10 to facilitate a movement operation of the clasp body 12.

In addition to the embodiments above, in an embodiment of the present disclosure, the base 11 is further provided with at least one locking section 113. The locking section 113 is for coordinating with a locking fixture 101, so that in addition to be arranged at the first object 10 by using the assembly section 111 and the anti-rotation assembly section 112, the base 11 can be assembled and connected to the first object 10 by simultaneously (or separately) using the locking section 113 in coordination with the locking fixture 101. Thus, the base 11 can be stably arranged at the first object 10 to facilitate a movement operation of the clasp body 12.

In addition to the embodiments above, in an embodiment of the present disclosure, the base 11 is provided with a containment area 114, in which the clasp body 12 and the elastic body 13 are movably disposed. Thus, when the clasp body 12 moves horizontally on the base 11 to compress or release the elastic body 13, the containment area 114 can be used as a movement space, thereby achieving an effect of smooth movement to facilitate a lock or unlock operation.

In addition to the embodiments above, in an embodiment of the present disclosure, each of two sides of the clasp body 12 is provided with a sliding portion 121, and each of two sides in the base 11 is provided with a sliding groove 115, wherein each of the sliding portions 121 is docked with each of the sliding groove 114, so as to movably dispose the clasp body 12 at the base 11. When the clasp body 12 moves horizontally on the base 11, the containment area 114 can be used as a movement space, and the sliding portions 12 in coordination with the sliding grooves 115 can serve as guide and travel distance limitation for movement, thereby achieving an effect of smooth movement to facilitate a lock or unlock operation.

In addition to the embodiments above, in an embodiment of the present disclosure, each of the sliding portions 121 is provided with a limiting slider 122, and each of the sliding grooves 115 is provided with a sliding restriction section 116, wherein each of the limiting sliders 122 is disposed in each of the sliding restriction sections 116, so as to limit a movement distance of the clasp body 12 on the base 11. Each of two sides of the base 11 is provided with a guiding section 117, and each of the limiting sliders 122 is disposed at each of the sliding restriction sections 116 via each of the guiding sections 117. When the clasp body 12 moves horizontally on the base 11, the containment area 114 can be used as a movement space, and the coordination of the sliding portions 121, the limiting sliders 122, the sliding grooves 115, and the sliding restriction sections 116 is used as guide and travel distance limitation for the movement of the clasp body 12 on the base 11, thereby achieving an effect of smooth movement to facilitate a lock or unlock operation.

In addition to the embodiments above, in an embodiment of the present disclosure, one end of the clasp body 12 is provided with a first limiting flange 123 and a second limiting flange 124. The first limiting flange 123 and the second limiting flange 124 can be used to engaging connect and couple the second object 20, or disengage and separate the second object 20. One end of the first limiting flange 123 is provided with a guiding slope section 125, and the second object 20 pushes against the guiding slope section 125, such that the clasp body 12 is pushed and reset by the elastic body 13 after moving horizontally, and the first limiting flange 123 and the second limiting flange 124 engaging connect and couple the second object 20. The second object 20 is provided with a recessed section 201, and the recessed section 201 of the second object 20 is fitted into the second limiting flange 124 via the first limiting flange 123, such that the first limiting flange 123 abuts against the second object 20. Moreover, one end of the base 11 is provided with a contact section 118 which corresponds to the first limiting flange 123, such that the first limiting flange 123 abuts against a top surface of the second object 20 and the contact section 118 abuts against a bottom surface of the second object 20.

On the basis of the embodiments above, during use, the fastening apparatus 1 can be assembled on the first object 10, and then the recessed section 201 of the second object 20 is directly pressed down upon the guiding slope section 125 of the clasp body 12, such that the clasp body 12 moves horizontally and compresses the elastic body 13. Once the recessed section 201 of the second object 20 is fitted into the second limiting flange 124 via the first limiting flange 123, the elastic body 13 is reset and the clasp body 12 is reset, so as to abut the first limiting flange 123 against the top surface of the second object 20 and abut the contact section 118 against the bottom surface of the second object 20, hence completing coupling between the clasp body 12 and the second object 20 (as shown in FIG. 6 and FIG. 7).

To separate the second object 20, the clasp body 12 is moved horizontally in a direction away from the second object 20 and the elastic body 13 is compressed, such that the first limiting flange 123 and the second limiting flange 124 separate from the recessed section 201 of the second object 20. Then, the elastic body 13 is reset and the clasp body 12 is pushed to facilitate a next operation of the clasp body 12. Thus, the base 11 can be assembled with the first object 11, and the base 11 can be engaging connected and disengaged with the coordination of the clasp body 12, so as to couple or separate the clasp body 12 from the second object 20 to complete coupling and separation of two objects, hence achieving the effects of repeated quick coupling and separation.

In addition to the embodiments above, in an embodiment of the present disclosure, the base 12 is provided with an operating section 126, which is operable to control the movement of the clasp body 12 on the base. Thus, when the clasp body 12 is moved, a force is applied upon the operating section 126 for a control operation, so as to better control the clasp body 12 to coordinate with the base 11 for engaging connection or disengagement, further coupling or separating the second object 20 to complete coupling and separation of two objects, hence achieving the effects of repeated quick coupling and separation.

In addition to the embodiments above, in an embodiment of the present disclosure, one end of the elastic body 13 is integrally connected with the clasp body 12 and the other end of the elastic body 13 pushes against the base, such that the elastic body 13 pushes the clasp body 12 to be normally located at a lock position or normally located at an unlock position. In an embodiment of the present disclosure, one end of the elastic body 13 is provided with a compression segment 131, and the other end of the elastic body 13 is provided with an assembly section 132. The compression segment 131 and the clasp body 12 are integrally connected, and the assembly section 132 is joined at a securement section 119 of the base 11, such that the elastic body 13 pushes the clasp body 12 to be normally located at a lock position or normally located at an unlock position.

On the basis of the embodiments above, when the clasp body 12 moves horizontally, the coordination of the compression segment 131 and the assembly section 132 is employed to first make the clasp body 12 compress the elastic body 13, and then the elastic body 13 is reset and the clasp body 12 is pushed, such that the elastic body 13 pushes the clasp body 12 to be normally located at the lock position or normally located at the unlock position, thereby allowing the clasp body 12 to perform engaging connection or disengagement. Thus, the clasp body 12 is coupled to or separated from the second object 20, so as to complete coupling and separation of two objects, hence achieving the effects of repeated quick coupling and separation.

In addition to the embodiments above, in an embodiment of the present disclosure, the elastic body 13 can be an elastic element bending continuously. The elastic body 13 is a plastic member, a metal member, or an elastic piece integrally connected with the clasp body 12. An appearance of the elastic body 13 or an appearance of an elastic region generated by the elastic body 13 is in an S shape, a continuous S shape, an approximate S shape, or an approximate continuous S shape. Thus, the elastic body 13 can similarly be made to push the clasp body 12 to be normally located at the lock position or normally located at the unlock position, thereby allowing the clasp body 12 to perform engaging connection or disengagement. Thus, the clasp body 12 is coupled to or separated from the second object 20, so as to complete coupling and separation of two objects, hence achieving the effects of repeated quick coupling and separation.

The present disclosure is described by way of the preferred embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A fastening apparatus, comprising:
   a base, configured to be arranged at a first object;
   a clasp body, movably disposed at the base, the clasp body being moved so as to couple or separate a second object; and
   an elastic body, disposed between the base and the clasp body and pushing against the clasp body, such that the clasp body is normally located at an engaging connection position or normally located at a disengagement position, wherein one end of the elastic body is integrally formed with the clasp body, and one other end of the elastic body pushes against the base, such that the elastic body pushes the clasp body to be normally located at a lock position or normally located at an unlock position.

2. The fastening apparatus according to claim 1, wherein a bottom of the base is provided with at least one assembly section, the assembly section is for the base to be arranged at the first object, or the assembly section is arranged at the first object by means of engaging connection, solder connection, welding connection, lock connection, expansion connection, or adhesion.

3. The fastening apparatus according to claim 1, wherein a bottom of the base is provided with at least one anti-rotation assembly section, which is for the base to be arranged at the first object and provides an anti-rotation function.

4. The fastening apparatus according to claim 1, wherein the base is provided with at least one locking section, which coordinates with a locking fixture for the base to be arranged at the first object.

5. The fastening apparatus according to claim 1, wherein the base is provided with a containment area, in which the clasp body and the elastic body are movably disposed.

6. The fastening apparatus according to claim 1, wherein each of two sides of the clasp body is provided with a sliding portion, each of two sides in the base is provided with a sliding groove, and each of the sliding portions is docked with each of the sliding grooves such that the clasp body is movably disposed at the base; or each of the sliding portions is provided with a limiting slider, each of the sliding grooves is provided with a sliding restriction section, and each of the limiting sliders is disposed at each of the sliding restriction sections so as to limit a movement distance of the clasp body on the base; or each of two sides of the base is provided with a guiding section, and each of the limiting sliders is disposed at each of the sliding restriction sections via each of the guiding sections.

7. The fastening apparatus according to claim 1, wherein one end of the clasp body is provided with a first limiting flange or a second limiting flange, and the first limiting flange and the second limiting flange are for engaging connecting and coupling the second object, or disengaging and separating the second object; or one end of the first limiting flange is provided with a guiding slope section, and the second object pushes against the guiding slope section, such that the clasp body is pushed and reset by the elastic body after moving horizontally, and the first limiting flange and the second limiting flange engaging connect and couple the second object; or the second object is provided with a recessed section, and the recessed section of the second object is fitted into the second limiting flange via the first limiting flange, such that the first limiting flange abuts against the second object; or one end of the base is provided with a contact section which corresponds to the first limiting flange, such that the first limiting flange abuts against a top surface of the second object and the contact section abuts against a bottom surface of the second object.

8. The fastening apparatus according to claim 1, wherein the clasp body is provided with an operating section, which is operable to control the clasp body to move horizontally on the base, such that the clasp body coordinates with the base for engaging connection or disengagement, further coupling or separating the second object.

9. The fastening apparatus according to claim 1, wherein one end of the elastic body is provided with a compression segment, one other end of the elastic body is provided with an assembly section, the compression segment and the clasp body are integrally connected, and the assembly section is joined at a securement section of the base, such that the elastic body pushes the clasp body to be normally located at a lock position or normally located at an unlock position.

10. The fastening apparatus according to claim 1, wherein the elastic body is an elastic element bending continuously; or the elastic element is a plastic member, a metal member, or an elastic piece integrally connected with the clasp body; or an appearance of the elastic element or an appearance of an elastic region generated by the elastic element is in an S shape, a continuous S shape, an approximate S shape, or an approximate continuous S shape.

11. A fastening apparatus, comprising:
a base, configured to be arranged at a first object;
a clasp body, movably disposed at the base, the clasp body being moved so as to couple or separate a second object; and
an elastic body, disposed between the base and the clasp body and pushing against the clasp body, such that the clasp body is normally located at an engaging connection position or normally located at a disengagement position,
wherein each of two sides of the clasp body is provided with a limiting slider, each of two sides of the base is provided with a sliding restriction section, each of the limiting sliders is disposed at each of the sliding restriction sections so as to limit a movement distance of the clasp body on the base.

* * * * *